Patented Oct. 29, 1929

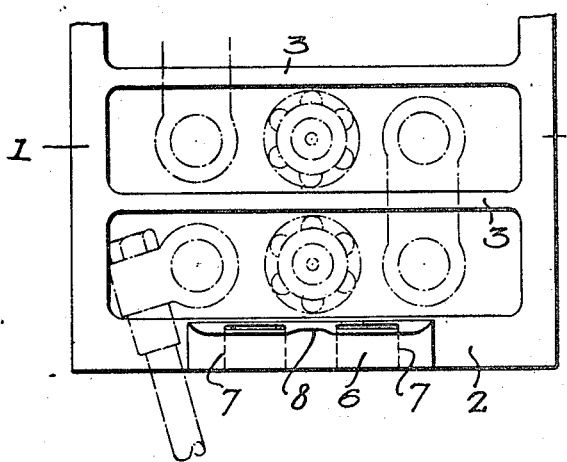
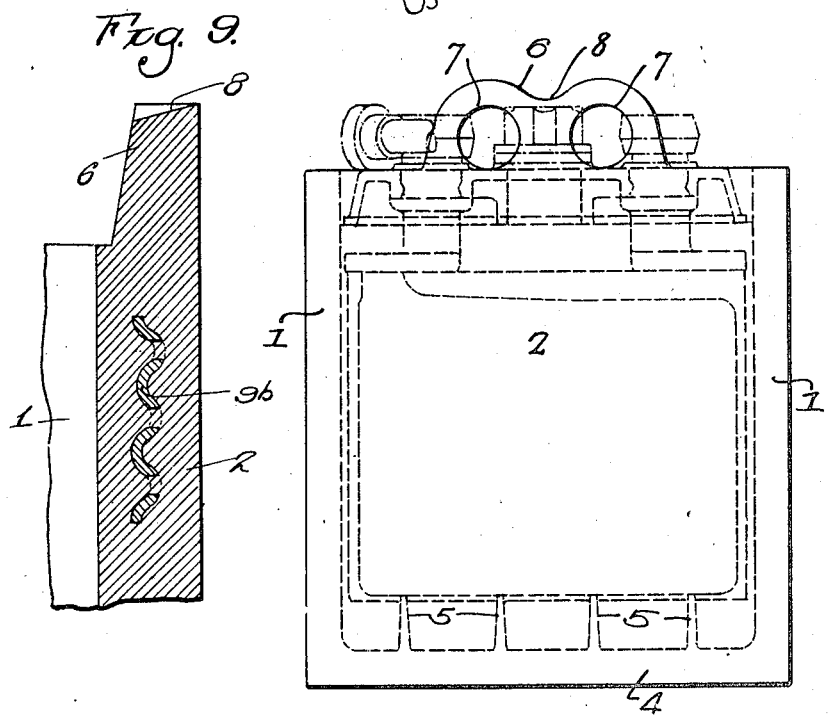
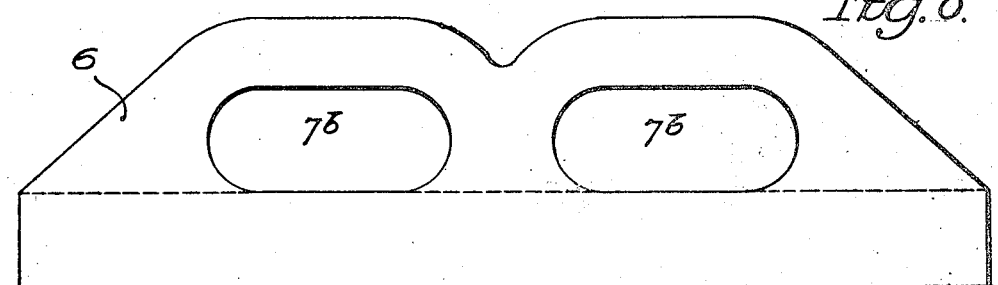

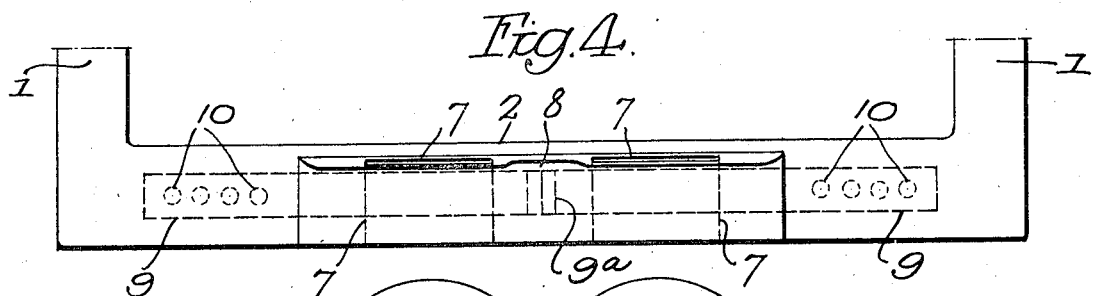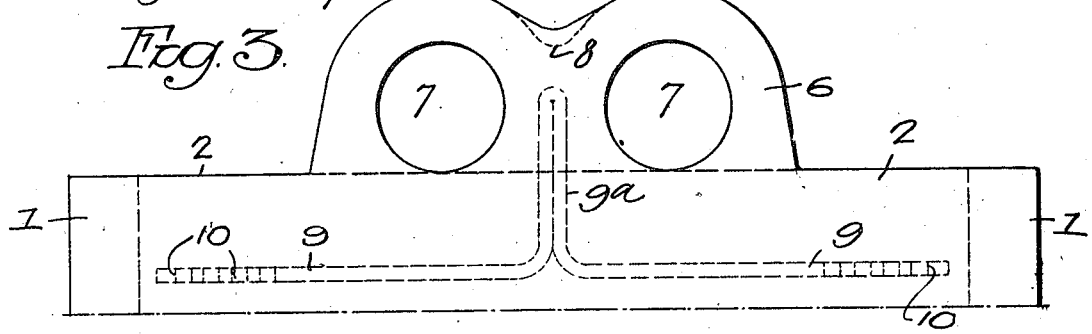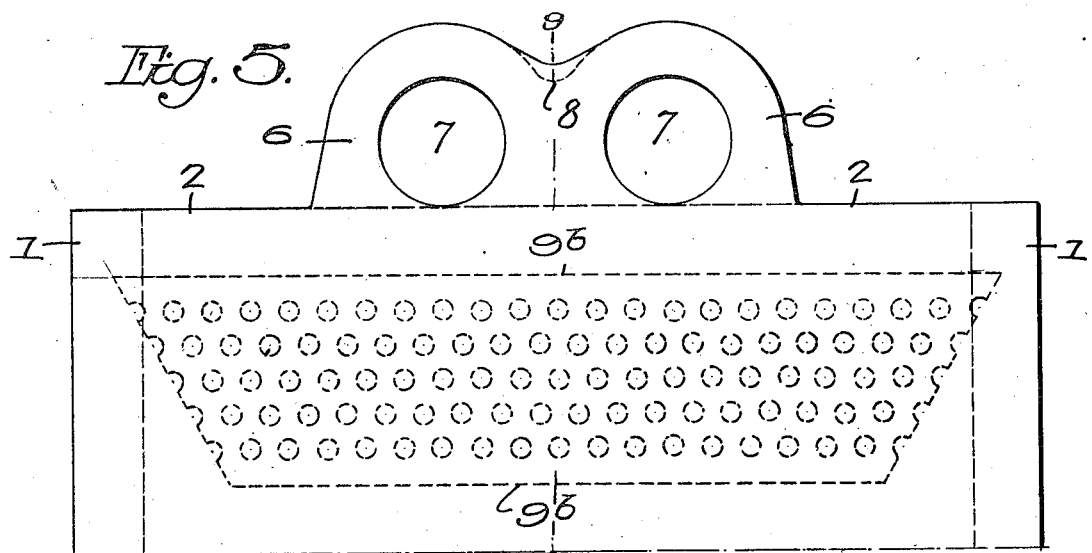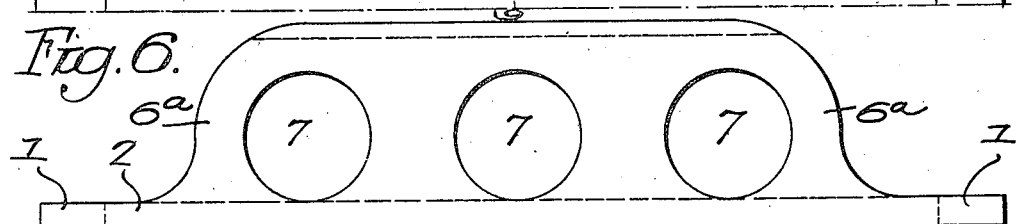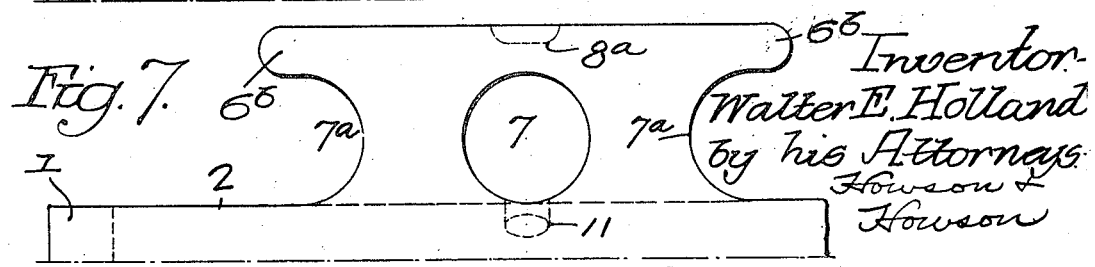

1,733,878

UNITED STATES PATENT OFFICE

WALTER E. HOLLAND, OF PHILADELPHIA, PENNSYLVANIA, ASSIGNOR TO PHILADELPHIA STORAGE BATTERY COMPANY, OF PHILADELPHIA, PENNSYLVANIA, A CORPORATION OF PENNSYLVANIA

BATTERY-CASE CONSTRUCTION

Application filed June 4, 1921. Serial No. 474,896.

One object of my invention is to provide an improved molded battery case or container particularly designed to eliminate exposed metallic or other corrodible parts; and the invention especially contemplates a construction which shall be durable, not likely to deteriorate under conditions of use and which may be convenient to handle.

A further object of the invention is to provide a battery container which shall include integral end handles particularly adapted for the reception of hold-down hooks or clamps and which shall have ample strength and stiffness to withstand the pressure of such hold-downs as well as the strains incident to handling and use.

The invention also contemplates the provision of novel means whereby the walls of a battery container of the above type may be stiffened with a view to preventing distortion when they are softened by heat.

These objects and other advantageous ends I attain as hereinafter set forth, reference being had to the accompanying drawings, in which, Figs 1 and 2 are respectively an end elevation and a plan of a battery container embodying my invention;

Figs. 3 and 4 are respectively a fragmentary end elevation and a plan illustrating the preferred form of handle and container construction;

Fig. 5 is a fragmentary elevation of one end of a battery container, illustrating an alternate form of the invention;

Figs. 6, 7 and 8 are fragmentary end elevations illustrating other modifications of the invention, Fig. 9, is a vertical section on the line 9—9, Fig. 5.

Referring to the above drawings, 1—1 represent the sides and 2 one end of a battery case formed of a single integral body of hard rubber or equivalent insulating acid-proof material which may, if desired, have any suitable number of transverse, vertically extending partitions 3 whereby it is divided into a number of cell compartments. It also includes a bottom 4 preferably having upwardly-projecting plate-supporting ribs 5 all integral with the sides and partitions. In addition, each of the end members 2 of the container is formed with an integral upwardly-extended portion 6 constituting a handle having in it a plurality of openings 7, in the present instance of circular outline, for the reception of fingers or of a suitable hook or tool for moving or carrying the battery. This upwardly-extended handle portion is preferably depressed or recessed between the finger openings 7 to provide a notch 8 for the reception of a hold-down hook or clamp and the bottom of this notch is inclined inwardly to prevent the disengagement from it of such clamp or hook. The handle projection itself is preferably slightly tapered in thickness on the inside from the bottom to the top to provide clearance to facilitate the assembling and removing of plate elements and covers.

In order to prevent bulging or other distortion of the walls of the battery container, particularly adjacent their unsupported upper edges, I may imbed and completely enclose within the material constituting these walls reinforcing elements 9 of metal, or other material not softened by the highest temperatures obtaining in batteries, which effectually strengthen the walls and hold them in place in the event of their softening by heat.

In Figs. 3 and 4 this reinforcing device has the form of a strip or bar extending parallel with the top edge of the container wall 2, in which it is imbedded, some distance below the top edge of the same. It is, however, bent on itself to provide a portion $9^a$ projecting upwardly into the handle extension 6 between the finger holes 7. In order to firmly tie this reinforcing bar to the material of the case it may be formed with perforations 10 at any desired points into or through which the material of the case extends. It may also be coated or have otherwise applied to it some metal, such as antimony, bismuth, arsenic or alloy containing at least one of these metals, which bonds with the material of which the case is made,—in the present instance hard rubber. In place of a bonding metal I may use any suitable cement or gum between the reinforcement and the material of the case.

The reinforcement of the sides or end walls of the case may obviously have forms other than that shown in Figs. 3 and 4, and as typical of these I have shown in Figs. 5 and 9 a corrugated, perforated plate 9ᵇ. This as before is completely enclosed in and protected by the material of the container structure and is so positioned as to best reinforce and strengthen the otherwise unsupported top portion of each end 2 of the battery container.

As shown in Fig. 6, I may employ more than two finger holes 7 in the handle portion 4 at each end of the battery case and in said figure I have shown said portion 6ᵃ as having three such finger holes. If desired, without departing from my invention, each handle extension may have its side portions cut away as shown in Fig. 7 so that while there is but a single finger hole 7 there is on each side of it a recess or opening 7ᵃ serving the same function as the outer holes 7 in the construction shown in Fig. 6.

While in Figs. 1 to 7 inclusive I have shown the finger holes as circular in outline, these may be laterally elongated as indicated at 7ᵇ in Fig. 8, without departing from my invention. In any case I preferably provide between them or at the middle of the handle section an inwardly sloping recess or notch for the reception of a hook or hold-down clamp, or else I slope the entire top of the handle inwardly as shown in Fig. 6, for the same purpose. In some cases I may provide a lower hold-down recess 11 as shown in Fig. 7. In all instances it will be noted that my battery container has no exposed metal portions and where it utilizes metal for the reinforcement of its relatively extended walls, this is completely enclosed so that it cannot be affected by the electrolyte or otherwise corroded.

The projecting handle portions 6, etc. are preferably so made and so situated that they do not interfere with the application of terminals to the posts or the passage of the conductors to or from the battery and they are of such construction as to provide ample strength to withstand the pressure of hold-down clamps as well as the horizontal and vertical strains incident to handling. When provided with metallic or other relatively stiff reinforcements, the walls of the container are so strengthened and held as to effectually resist internal pressure or other strains tending to bulge or distort them, even when the material of which they are made becomes soft or pliable, as might happen in the event of the battery becoming over-heated.

I claim:

1. As a new article of manufacture, a battery container consisting of an integral body of substantially rigid material having its walls extended to provide handle projections each formed with at least two transversely arranged finger openings defining a substantial intermediate reinforcing rib.

2. As a new article of manufacture a battery container consisting of an integral body of material having its walls extended to provide handle projections each formed with a plurality of finger openings and having in its upper surface and intermediate said openings a recess for a hold-down clamp.

3. As a new article of manufacture a battery container consisting of an integral body of substantially rigid material having its walls extended to provide handle projections each formed with a plurality of finger openings and made solid at substantially the middle portion of its upper surface for the reception of a hold down clamp.

4. As a new article of manufacture, a battery container consisting of an integral body of material having its walls extended to provide handle projections each formed with a plurality of finger openings, with reinforcing members embedded within said walls and extended upwardly into said handle intermediate said finger openings.

5. As a new article of manufacture, a battery container consisting of an integral body of material having its walls extended to provide handle projections each formed with a plurality of finger openings, said projections being recessed at the top and intermediate said openings for reception of a hold-down clamp, and reinforcing members embedded within said walls and extending upwardly into said handle at points under the recesses.

6. As a new article of manufacture, a battery container consisting of an integral body of rubber compound having its walls extended to provide handle projections, each having at least two finger openings defining a substantially vertical reinforcing rib.

7. As a new article of manufacture, a battery container consisting of an integral body of material having its walls extended to provide handle projections, each formed with a plurality of finger openings, said projections being recessed at the top and intermediate said openings for reception of hold down clamps, and reinforcing members embedded in said walls and extending upwardly into said handles in line with the recesses whereby strain is transmitted from the hold down clamps to said walls.

WALTER E. HOLLAND.